United States Patent [19]
Tanaka et al.

[11] Patent Number: 5,139,625
[45] Date of Patent: Aug. 18, 1992

[54] FLUID TREATMENT APPARATUS AND METHOD OF ITS SHUTDOWN

[75] Inventors: Masaaki Tanaka; Akira Ikeda; Toshiaki Kobayashi; Ken-ichiro Yamanishi; Shin-ichi Inoue; Shigeki Nakayama, all of Amagasaki, all of Japan

[73] Assignee: Mitsubishi Denki Kabushiki Kaisha, Tokyo, Japan

[21] Appl. No.: 623,940

[22] PCT Filed: Jun. 25, 1990

[86] PCT No.: PCT/JP90/00819
§ 371 Date: Feb. 26, 1991
§ 102(e) Date: Feb. 26, 1991

[87] PCT Pub. No.: WO91/00246
PCT Pub. Date: Jan. 10, 1991

[30] Foreign Application Priority Data

Jun. 26, 1989 [JP] Japan ............... 1-163551

[51] Int. Cl.⁵ ............... C25B 15/08; C25B 9/00
[52] U.S. Cl. ............... 204/130; 204/149; 204/273; 204/274; 204/275; 204/277; 204/278
[58] Field of Search ............... 204/273, 275-278, 204/302, 149, 131, 130, 274

[56] References Cited

U.S. PATENT DOCUMENTS

| | | | |
|---|---|---|---|
| 4,101,409 | 7/1978 | Austin | 204/277 |
| 4,351,734 | 9/1982 | Kauffman | 204/302 X |
| 4,983,265 | 1/1991 | Maruyama | 204/277 X |
| 5,002,204 | 3/1991 | Sakai | 204/149 X |
| 5,022,974 | 6/1991 | Häivälä | 204/149 X |

FOREIGN PATENT DOCUMENTS

60-6718 2/1985 Japan .

OTHER PUBLICATIONS

Paper No. ED-73-22, "Generation of Discharges in Underwater Bubbles and Their Utilization".

*Primary Examiner*—Donald R. Valentine

[57] ABSTRACT

This invention concerns a fluid treatment apparatus wherein active particles are used to perform fluid treatment.

As active particles have a very short lifetime, it has conventionally been difficult to use them for fluid treatment. In this invention, active particles generated in electrolytic dissociation chamber (104) under reduced pressure are aspirated by a fluid jetted from jetting throat (108) into a diffuser throat (110), and then perform treatment of the source fluid.

24 Claims, 9 Drawing Sheets

FLUID TREATMENT APPARATUS AND METHOD OF ITS SHUTDOWN

1. Technical Field

This invention concerns a fluid treatment apparatus which uses active particles such as oxygen atoms and hydroxyl radicals (referred to hereinafter as OH radicals), and a procedure for shutting down the apparatus.

2. Background Art

Ozone is a powerful oxidizing agent. As it ultimately reverts to oxygen, it does not give rise to secondary pollution, and it has therefore conventionally been used for fluid treatment such as the removal of organic contaminants or the elimination of bacteria from water of air.

Oxygen atoms and OH radicals offer the same advantages as ozone, an as they are even more powerful oxidizing agents, their use permits much more effective fluid treatment. These species are however extremely short-lived and as a result it was difficult to utilize them.

Figure 1:
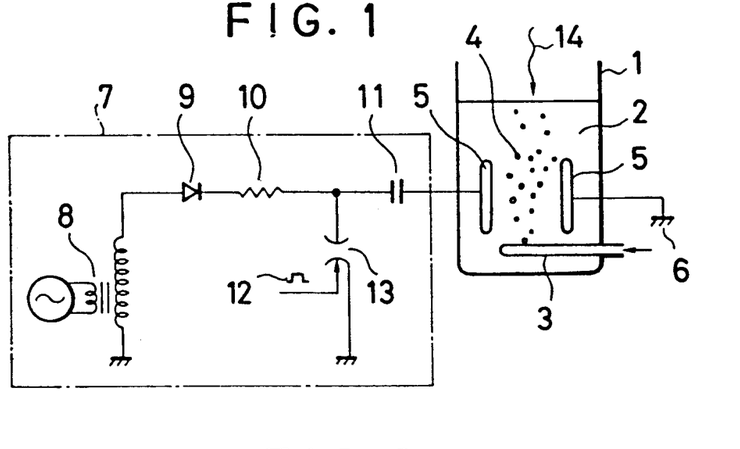
FIG. 1 is a drawing showing the construction of a conventional water treatment apparatus.

An apparatus using oxygen atoms for water treatment has been proposed in Paper No. ED-73-22 (Generation of Discharges in Underwater Bubbles and their Utilization), of Papers of Technical Meeting on Electrical Discharge, Institute of Electrical Engineers of Japan. FIG. 1 shows the structure of this apparatus. In the figure, (1) is a reservoir where source water (water to be treated) (2) is stored, and (3) is a tube immersed in the source water (2), and drilled with small surface holes. Air containing oxygen is supplied to this tube (3), and bubbles (4) are produced by the small holes. (5) are a pair of electrodes arranged in the water reservoir (1) on opposite sides of the bubbles (4) generated by the holes in tube (3). One electrode is connected to ground (6), while the other is electrically connected to a circuit (7) which applies an impulse voltage. This impulse voltage circuit (7e comprises a high voltage transformer (8), a high voltage diode (9) connected to this high voltage transformer (8), a current limiting resistor (10) connected to this high voltage diode (9), a capacitor (11) of which one electrode is connected to this current limiting resistor and the other electrode is connected to one of the electrodes (5), and a gap switch (13) which operates so that when it is activated by a trigger pulse (12), the high voltage to which capacitor (11) is charged is applied to the electrode. Further, (14) are X rays generated by an X-ray machine (not shown) which irradiate the bubbles (4) in the source water (2) in reservior (1).

The operation of this apparatus will now be described. When air is blown into tube (3) which is immersed in reservoir (1), and escapes from the holes in the tube, it forms numerous bubbles (4) in the water (2). At the same time, the voltage generated by high voltage transformer (8) is applied to capacitor (11) via high voltage diode (9) and current limiting resistor (10), and capacitor (11) thereby becomes charged to a high voltage. Gap switch (13) is then activated by a trigger pulse (12), and the high voltage with which capacitor (11) is charged is applied to electrode (5) as an impulse voltage of several $\mu$ sec. duration. At the same time, the water (2) is irradiated by X-rays, and a discharge then takes place in bubbles (4). This discharge causes oxygen molecules in the bubbles to electrolytically dissociate into oxygen atoms. In the bubbles, the lifetime of these oxygen atoms is no more than several $\mu$ sec., but the oxygen atoms produced near the surface of the bubble, i.e., near the interface with water react with the water (2) before they are destroyed. The water is thus purified.

In the above apparatus, an impulse voltage of approx. 1. $\mu$ sec. is applied and X ray irradiation (14) is used to generate an electric discharge in the bubbles (4). Normally, when a high voltage is applied to water (2) so as to generate a discharge, the water boils immediately. In this apparatus, since the ozonizer discharge lasts for no more than 0.1 $\mu$ sec. an impulse voltage of approx. 1 $\mu$ sec. duration is used as the applied voltage, and by reducing the time for which the voltage is applied, the boiling of the water is prevented. However, it is difficult to produce a discharge in the bubbles (4) in the water unless there is a sufficient supply of initial electrons. X rays (14) are therefore used to promote electrolytic dissociation in the bubbles (4), generate initial electrons and produce a discharge in the bubbles.

In the water treatment apparatus of the above construction, the lifetime of the oxygen atoms is extremely short. For this reason, the electric discharge has to be produced inside bubbles (4), which requires a circuit (7) which applies an impulse voltage and an X-ray machine which generates X-rays (14). The apparatus is therefore necessarily complex.

This invention was conceived to overcome the above problems. It aims to provide a fluid treatment apparatus of simple construction wherein active oxygen is produced efficiently in high concentration so as to permit a high degree of fluid treatment. It also aims to provide a suitable method of shutting down this apparatus such that fluid treatment can continue to be performed efficiently even when the apparatus is used over long periods of time.

DISCLOSURE OF THE INVENTION

The fluid treatment apparatus of this invention comprises an electrolytic dissociatioin chamber into which a fluid is introduced and which electrolytically dissociates the fluid to generate active particles, a supply inlet to which a source fluid to be treated by the active particles is supplied, a jetting throat which spouts or jets source fluid coming from the supply inlet, and a diffuser throat in which fluid from the jetting throat aspirates active particles generated in the electrolytic dissociation chamber, and through which the fluid is ejected. In this apparatus, when source fluid from the supply inlet is jetted from the jetting throat toward the diffuser throat, it aspirates active particles generated in the electrolytic dissociation chamber. These active particles immediately dissolve in the fluid in the diffuser throat, and fluid treatment is thereby performed.

Further, gas from the electrolytic dissociation chamber is aspirated together with the active particles creating a low pressure in the chamber, and active particles are therefore produced in high concentration.

In another aspect of the invention, the fluid treatment apparatus alternatively comprises an electrolytic dissociation chamber into which a fluid is introduced and which electrolytically dissociates the fluid to generate active particles, a supply inlet to which a carrier gas is supplied to carry active particles to the source fluid to be treated, a jetting throat which jets carrier gas coming from the supply inlet, and a diffuser throat in which carrier gas from the jetting throat aspirates active particles generated in the electrolytic dissociation chamber and which delivers the carrier gas, wherein the carrier gas from the diffuser throat, and the active particles are supplied to the source fluid. In this apparatus, when carrier gas from the supply inlet is jetted from the jetting throat toward the diffuser throat, it aspirates active particles generated in the electrolytic dissociation chamber. These active particles, together with carrier gas, pass through the diffuser throat, and are delivered to the source fluid where they dissolve, and fluid treatment is thereby performed. In this apparatus also, a low pressure is created in the electrolytic dissociation chamber and active particles are generated in high concentration.

In a method of shutting down the water treatment apparatus according to this invention, the pressure at the opening of the diffuser throat where the active particles are aspirated is increased above the pressure at the other end, and the supply of source fluid to the supply inlet is then stopped. In this shutdown procedure, the supply of source fluid is stopped only after the pressure on the aspiration side of the diffuser throat has been increased above the pressure at the other end, and source fluid is thus prevented from flowing back from the diffuser throat.

BEST MODE OF CARRYING OUT THE INVENTION

The fluid treatment apparatus of this invention will now be described.

EMBODIMENT 1

The fluid treatment apparatus of Embodiment 1 of this invention may for example be a water treatment apparatus using oxygen atoms, which are active particles, as oxidizing agent.

Figure 2:
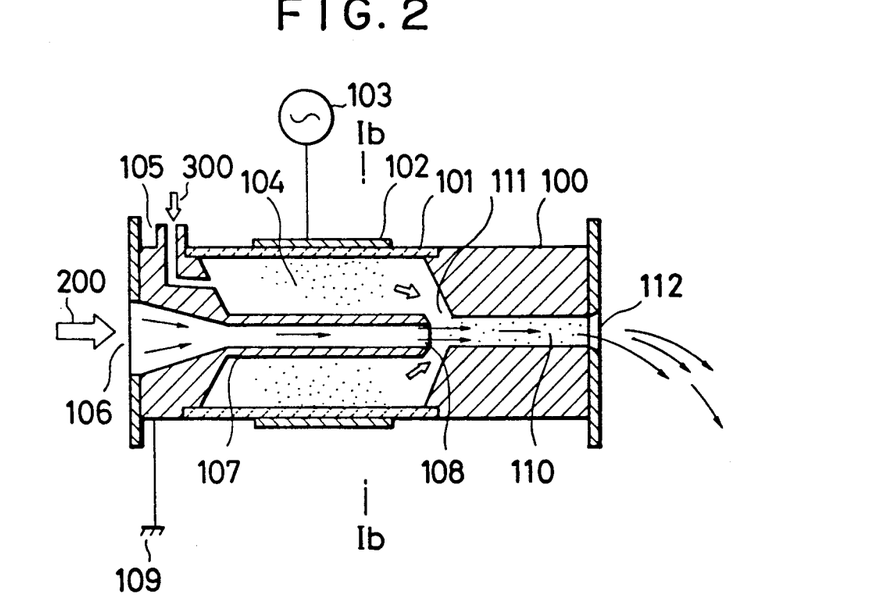
FIG. 2 is a longitudinal section of the water treatment apparatus in Embodiment 1 of this invention.
Figure 3:
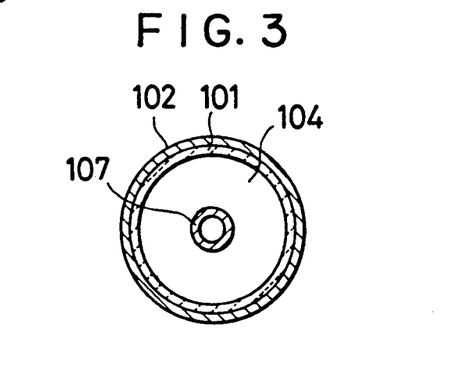
FIG. 3 is a section through the line Ib—Ib in FIG. 2.

FIG. 2 shows a longitudinal section of this water treatment apparatus, and FIG. 3 shows a section along the line Ib—Ib in FIG. 2.

In the figures, (100) is a discharge tube-integrated ejector. (101) is a cylindrical tube of a dielectric material such as glass with a hollow, and which forms the ejector. (102) is a ring-shaped charging electrode provided in the circumference of this dielectric tube (101), and electrically connected to an A. C. power supply (103). (104) is an electrolytic dissociation chamber formed in the hollow of the dielectric tube (101). A starting material fluid inlet (105) communicates with electrolytic dissociation chamber (104) to supply an oxygen-containing gas, for example oxygen itself (300), for the purpose of generating oxygen atoms by electrolytic dissociation. (106) is a supply inlet where source water (200) containing, for example, minute quantities of orgenic contaminants such as trihalomethanes ($CHCl_3$), or substances with a moldy odor such as diosmin or 2-methylisoborneol, is supplied under pressure to ejector (100). (107) is a nozzle which is inserted in the electrolytic dissociation chamber (104) and is provided with a jetting throat (108) in chamber (104). Pressurized fluid (200) is supplied to the nozzle (107) via the supply inlet (106), and is spouted or jetted through throat (108) of nozzle (107). Nozzle (107) is constructed of metal or the like, and is electrically connected to ground (109). Electrical discharges are generated in chamber (104) by means of dielectric tube (101), charging electrode (102) and A. C. power supply (103). Further, the distance between nozzle (107) and dielectric tube (101) is 1-2 cm so that the temperature produced in chamber (104) by the discharges rises to, for example 600K. (110) is a diffuser throat aligned in the direction in which source water (200) is jetted from nozzle (107) via gap (111) communicating with chamber (104). (112) is a delivery outlet through which fluid that has passed through the diffuser throat (110) is delivered from ejector (100). The arrows in the drawing indicate the flow direction of source water (200), while the white arrows show the direction taken by oxygen gas (300) which is supplied to chamber (104) and aspirated by jetted fluid.

Next, the operation of the discharge tube-integrated ejector (100) of the above construction will now be described. Oxygen gas at atmospheric pressure is supplied to chamber (104) from starting material fluid inlet (105) at a rate of 0.5 l/min, and source water (200) pressurized to, for example, approx. 2-3 kg/cm$^2$, is supplied from supply inlet (106) in ejector (100). This source water (200) passes through nozzle (107), is jetted from jetting throat (108) at high speed, and flows into diffuser throat (110). Gas in chamber (104) is then aspirated from gap (111) between nozzle (107) and diffuser throat (110), and the pressure in chamber (104) falls to aprox. 50 Torr. When a high voltage is applied to charging electrode (102) from A. C. power supply (103), a silent discharge is produced in low pressure chamber (104) between dielectric tube (101) and nozzle (107) which causes the temperature in the chamber to rise. Due to this silent discharge, the following reaction (1) occurs in the chamber to generate oxygen atoms:

$$O_2 + e \rightarrow O + O + e \qquad (1)$$

where e represents an electron.

In chamber (104) which is at high temperature and low pressure, the oxygen atoms generated according to equation (1) are produced in high concentration. These oxygen atoms are aspirated together with gas from chamber (104) through gap (111) between nozzle (107) and diffuser throat (110), by source water (200) which is jetted at high speed from nozzle (107). The aspirated oxygen atoms dissolve immediately in the source water (200) in diffuser throat (110), and as the water passes through the throat, organic contaminants such as trihalomethanes in the water are oxidized and decomposed by the powerful oxidizing action of oxygen atoms so as to permit a high degree of water purification.

Figures 4, 5:
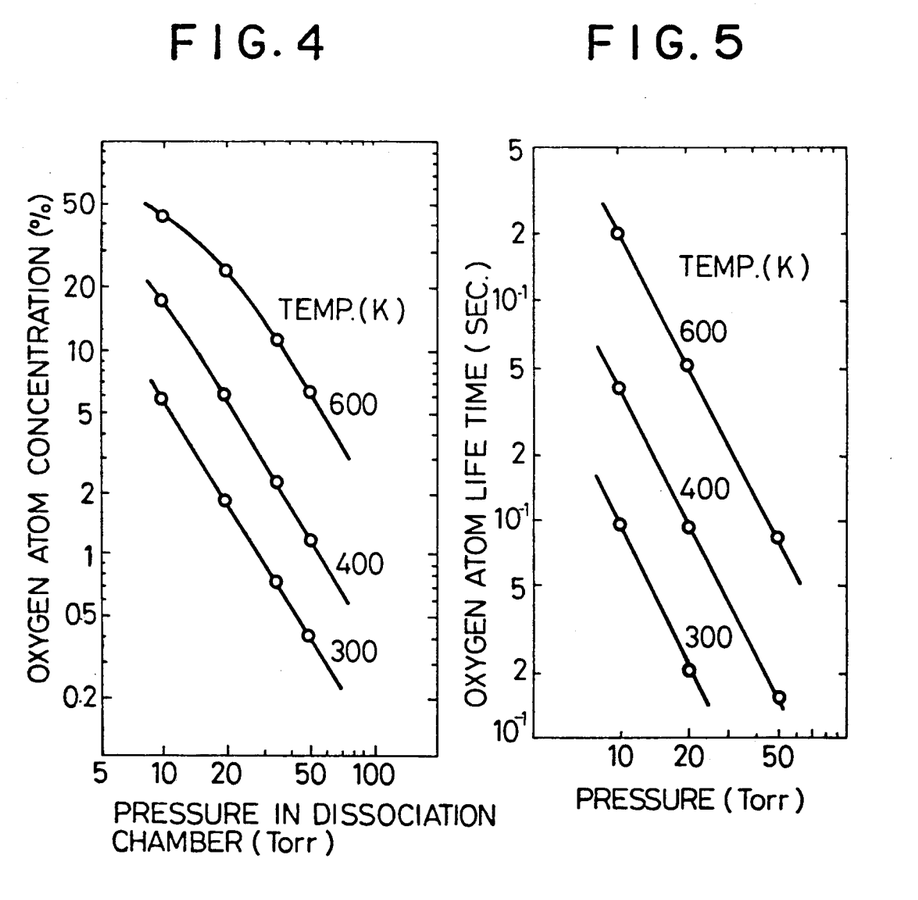
FIG. 4 is a diagram showing the relation between pressure and temperature, and oxygen atom generation concentration, in the electrolytic dissociation chamber of the water treatment apparatus of this invention.
FIG. 5 is a diagram showing the relation between pressure and temperature, and the lifetime of oxygen atoms, in the water treatment apparatus of this invention.

Further details will now be described with reference to FIG. 4 and FIG. 5. FIG. 4 is a diagram showing the relation between pressure and temperature in chamber (104), and the concentration of oxygen atoms produced in the chamber. FIG. 5 is a diagram showing the relation between pressure and temperature in chamber (104), and the lifetime of oxygen atoms. These figures were determined by the inventors by means of simulations. In the ejector of this embodiment, source water (200) is jetted at high speed from jetting throat (108), a low pressure is created in electrolytic dissociation chamber (104) due to the aspiration of gas from the chamber, and the temperature in the chamber is raised by increasing the size of the discharge gap between nozzle (107) and dielectric tube (101). As shown in FIG. 4, the lower the pressure in chamber (104), the higher the concentration of oxygen atoms that can be produced. The oxygen atoms which are generated by the reaction of equation (1) are converted to ozone by the reaction of equation (2) below:

$$O + O_2 + M \rightarrow O_3 + M \qquad (2)$$

where M represents a third body.

Equation (2) is a collision reaction between 3 bodies, and is therefore proportional to the square of the pressure. In this invention, however, the electrolytic dissociation chamber (104) in which oxygen atoms are generated is under a reduced pressure of approx. 50 Torr, so the reaction shown by equation (2) proceeds far more slowly than if the pressure were atomospheric. As a result, when an electric discharge is produced in chamber (104), the number of oxygen atoms destroyed by equation (2) is smaller, and a high concentration of oxygen atoms is obtained with a high electrical efficiency (number of oxygen atoms/discharge power). Further, as shown in FIG. 4, the higher the temperature in chamber (104), the higher the concentration of oxygen atoms generated. If the discharge is produced in chamber (104) at high temperature and low pressure, therefore, a high concentration of oxygen atoms can be obtained.

Further, as shown in FIG. 5, the lower the pressure and the higher the temperature, the longer the lifetime of oxygen atoms that can be achieved, and in chamber (104) of the above embodiment it is approx. 10 msec. Even without generating oxygen atoms inside bubbles (4) as in the conventional water treatment apparatus, therefore, oxygen atoms can be generated in the electrolytic dissociation chamber (104) described above, and introduced into source water (200) through gap (111) which communicates with the chamber, so as to achieve a high degree of purification before they are destroyed. It is thus possible to obtain a water treatment apparatus of simple construction using a high oxygen atom concentration, without the need for a circuit to apply an impulse voltage (7) and an X-ray machine (not shown).

In this water ejector, a powerful gas-liquid mixing action is obtained in diffuser throat (110). Oxygen atoms generated in chamber (104) of ejector (100) therefore dissolve welll in source water (200), and achieve a high degree of water purification.

Figure 6:
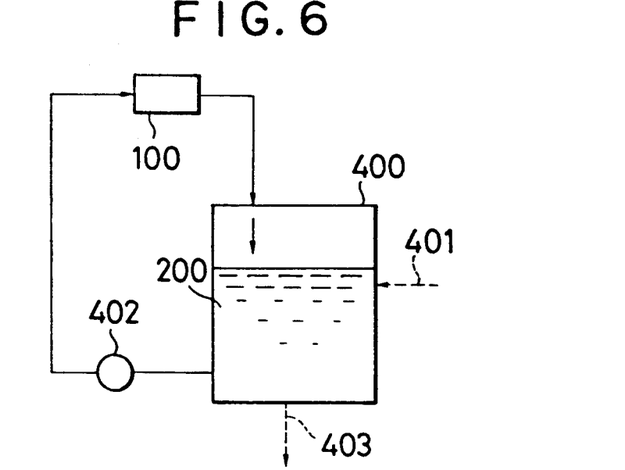
FIG. 6 is a drawing showing a water treatment system using the water treatment apparatus of Embodiment 1 of this invention.

A water treatment system using the ejector (100) of the above construction will next be described. In FIG. 6, (400) is a servioir which stores source water (200) and is provided with a source water inlet (401). (402) is a circulation pump for pressurizing and supplying source water (200) to the supply inlet (106) of ejector (100), and (403) is an extraction outlet from which water treated by the ejector can be drawn off.

The water treatment system of the above construction operates as follows. Firstly, source water (200) is drawn up from reservoir (400) by circulation pump (402). This source water is pressurized by pump (402) and supplied to inlet (106) of ejector (100), in order to be jetted through nozzle (107) at high speed into diffuser throat (110). When the source water passes through ejector (100), it is purified. The purified water is drawn off from extraction outlet (403).

Figure 7:
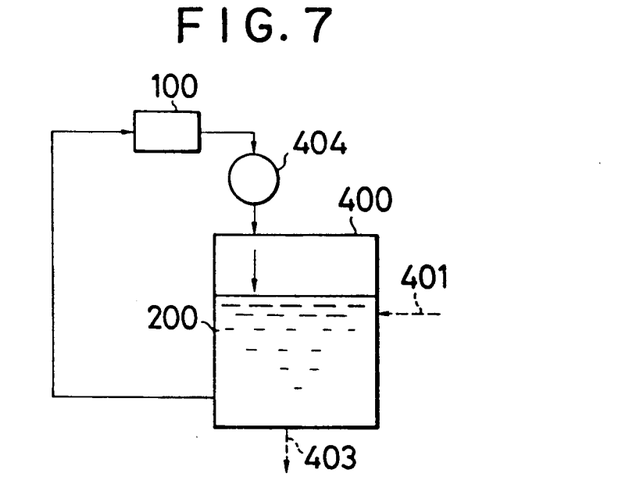
FIG. 7 is a drawing showing another water treatment system using the water treatment apparatus of Embodiment 1 of this invention.

Further, as shown in FIG. 7, a water tight vacuum pump (404) can be installed on the side of the delivery outlet (112) of the ejector instead of the circulation pump (402) used in the above water treatment system. In this case, a similar effect is obtained by aspirating source water (200) on the side of diffuser throat (110).

Figure 8:
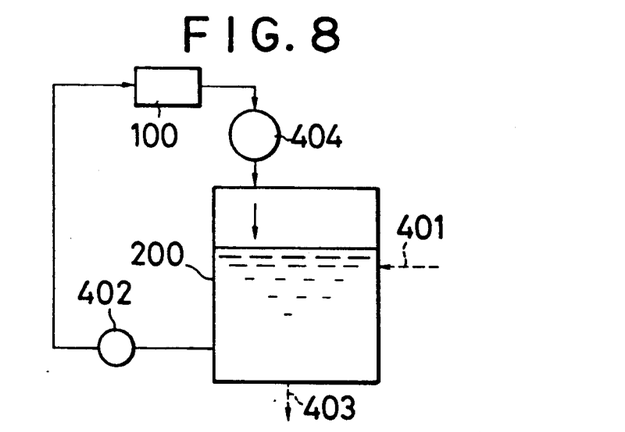
FIG. 8 is a drawing showing a futher water treatment system using the water treatment apparatus of Embodiment 1 of this invention.

Further, as shown in FIG. 8, an even lower pressure in electrolytic dissociation chamber (104) can be obtained by simultaneous use of a circulation pump (402) and water seal vacuum pump (404), and oxygen atoms can be generated at high temperature even more efficiently.

EMBODIMENT 2

Figure 9:
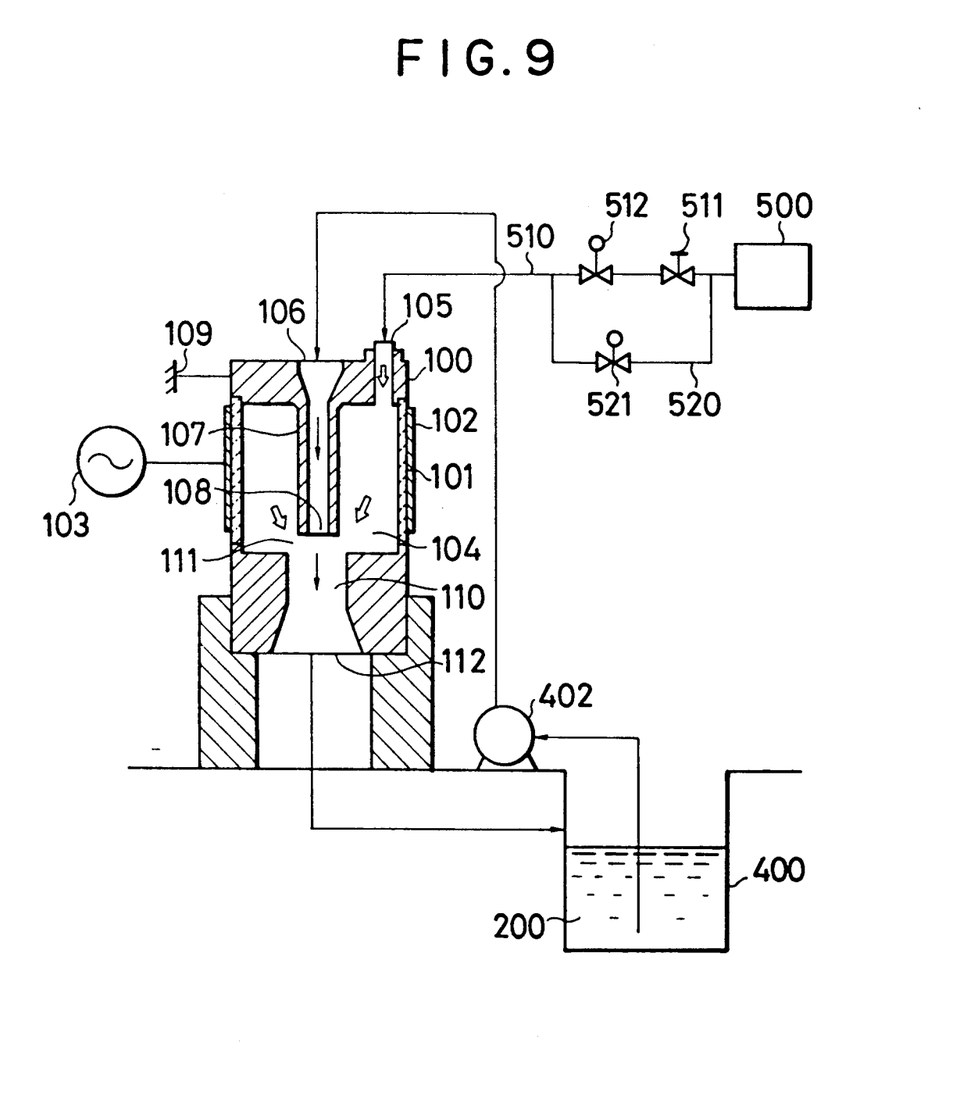
FIG. 9 is a longitudinal section of the water treatment apparatus of Embodiment 2 of this invention.

FIG. 9 is a drawing of a water treatment system using the discharge tube-integrated ejector (100) of Embodiment 2 of this invention. The ejector (100) of Embodiment 2 is installed such that the direction in which source water is jetted from nozzle (107) is the direction of gravitational force. In FIG. 9, (500) is an oxygen gas container for supplying oxygen gas (300) to ejector (100), (510) is a main channel for supplying oxygen gas (300) from this container (500) to electrolytic dissociation chamber (104), (511) is a valve installed in main channel (510) to regulate the supply of oxygen gas from container (500), (512) is an electromagnetic valve installed in the main channel (510) and connected to the valve (511) to control the supply of gas to chamber (104), (520) is a bypass arranged so as to bypass valve (511) and electromagnetic valve (512) installed in main channel (510), and (521) is an electromagnetic valve installed to adjust the pressure in chamber (104) to atmospheric pressure.

In the water treatment system of the above construction, as in the previous embodiment, source water (200) is pressurized by circulation pump (402), and supplied to ejector (100). This source water is purified by oxygen atoms generated as it passes through ejector (100), and then removed as highly purified water from delivery outlet (112).

In the ejector of this embodiment, the direction in which the source water (200) is jetted is that of gravity.

Also a result, source water (200) does not stay in chamber (104), and a high degree of water purification can be achieved constantly over a long periodd of use. In the case of Embodiment 1 where the source water (200) is jetted horizontally, water may remain in chamber (104) and lead to surface soiling of the dielectric tube (101) and nozzle (107). If this occurs, the electric discharge becomes unstable, the efficiency of generation of oxygen atoms declines, and consequently water treatment performance also declines.

Further, in the water treatment system of this embodiment, the following additional procedure is adopted during shutdown to prevent source water (200) from remaining in chamber (104). Firstly, application of voltage from the A.C. power supply (103) is stopped, then the electromagnetic valve (512) on main channel (510) is shut to stop the supply of oxygen gas (300). The bypass electromagnetic valve (521) in the bypass (520) is then opened, and a large quantity of oxygen gas is supplied to chamber (104) to raise its pressure above atmospheric. As the pressure of the delivery outlet (112) of diffuser throat (110) is atmospheric, the pressure at the opening of diffuser throat (110) communicating with chamber (104) is thereby increased above the pressure at the delivery outlet. Circulation pump (402) is then stopped to stop the supply of source water (200). Then, the electromagnetic valve (521) of bypass (520) is shut, and the apparatus stops.

By raising the pressure inside chamber (104) above atmospheric before shutting down circulation pump (402), source water (200) is prevented from flowing back from diffuser throat (110) into chamber (104).

In the water treatment system of the above construction, the source water (200) does not enter the electrolytic dissociation chamber (104), so stable water treatment is ensured over a long period of use.

Figure 10:
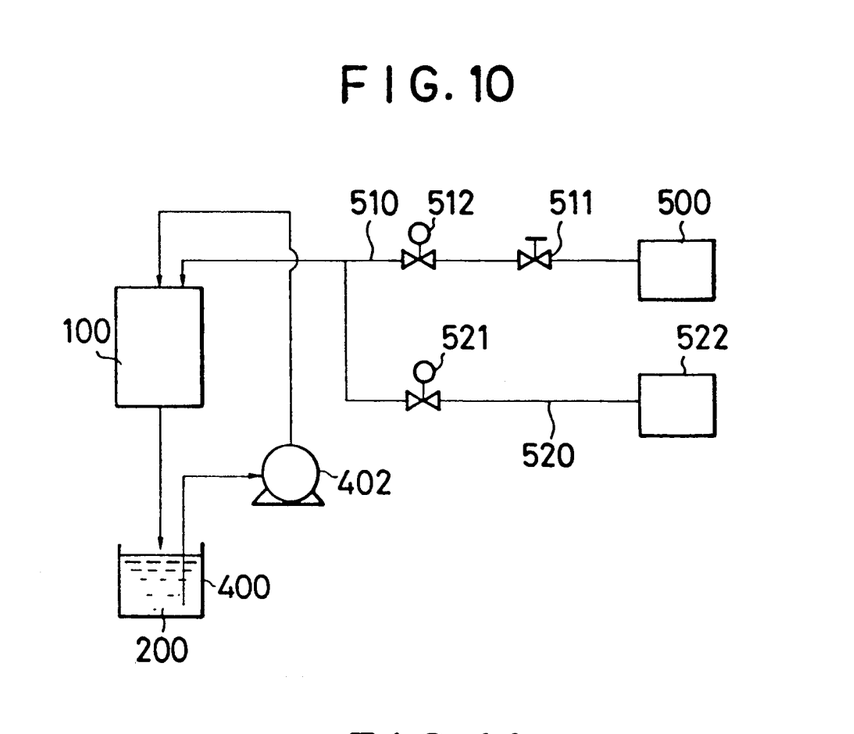
FIG. 10 is a drawing showing a water treatment system using the water treatment apparatus of Embodiment 2 of this invention.

In the above water treatment system, an oxygen-containing gas (300) generating active particles was used to increase the pressure in chamber (104) above atmospheric, but as shown in FIG. 10, a container of another gas can of course be connected to bypass (520), and the pressure in the chamber increased above atmospheric by this other gas.

Figure 11:
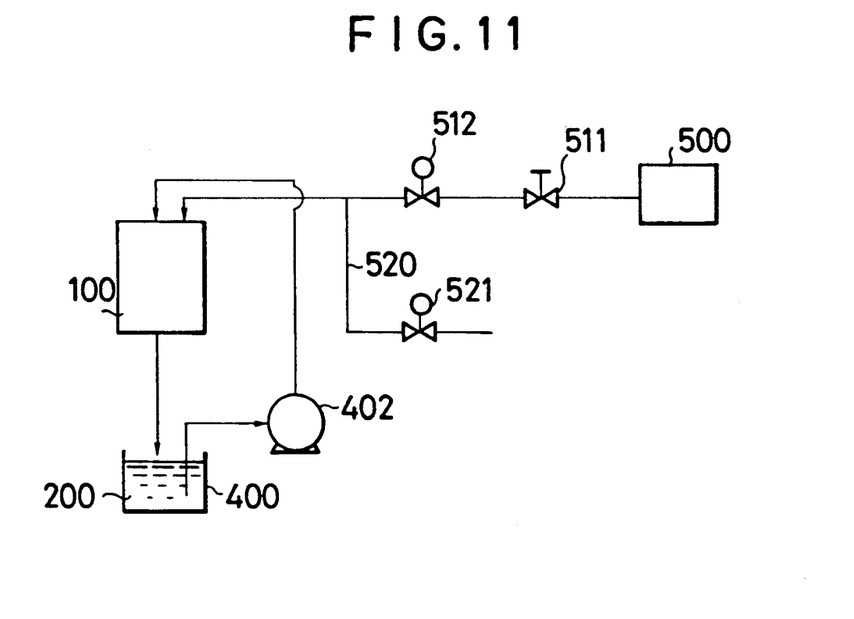
FIG. 11 is a drawing showing another water treatment system using the water treatment apparatus of Embodiment 2 of this invention.

Further, as shown in FIG. 11, even if electromagnetic valve (512) of bypass (520) is left open and air is introduced from outside, the pressure in the chamber can be adjusted to atmospheric and a similar effect to that of the above embodiment is obtained.

In the above embodiments, the pressure at the delivery outlet (112) of diffuser throat (110) is atmospheric. The invention is however not limited to this case, and if the pressure at the delivery outlet (110) is low, the pressure of chamber (104) may be less than atmospheric.

EMBODIMENT 3

Figure 12:
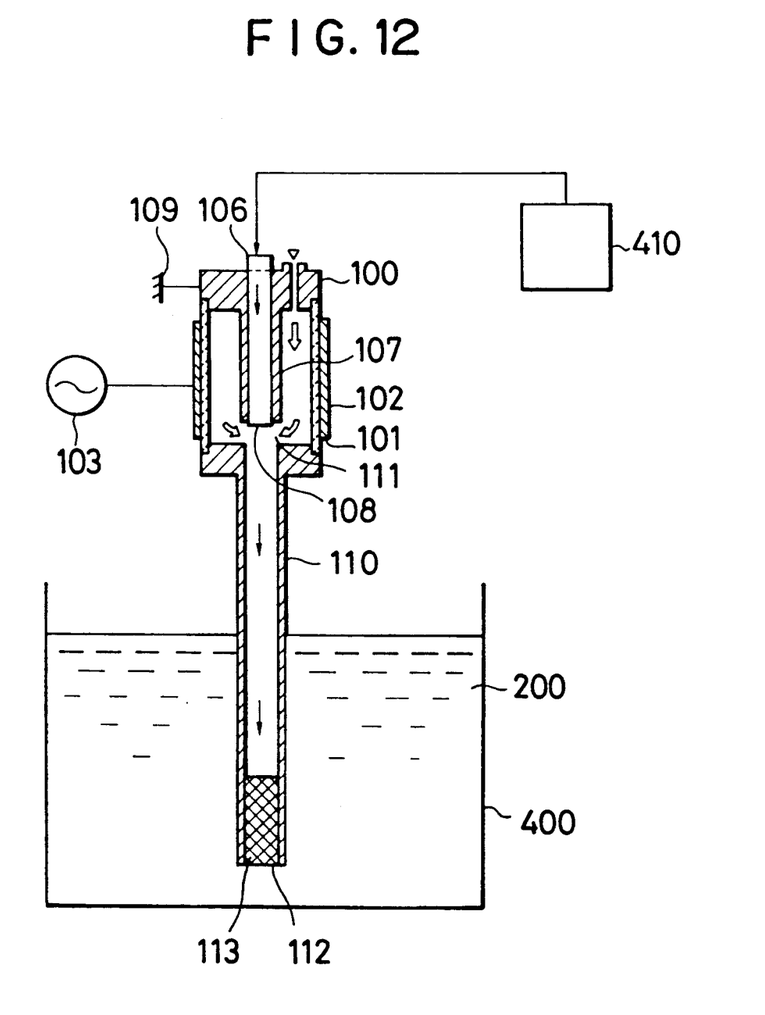
FIG. 12 is a longitudinal section of the water treatment apparatus in Embodiment 3 of this invention.

FIG. 12 is a longitudinal section through the water treatment apparatus of Embodiment 3 of this invention. In the figure, ejector (100) is of substantially similar construction to the discharge tube-integrated ejector of Embodiment 2, however in the ejector of Embodiment 3, the fluid jetted by nozzle (107) to reduce the pressure in chamber (104) is a gas. (113) is a diffusion tube which is installed at one end of diffuser throat (110) of ejector (100), and is immersed in a reservoir (400) of source water (200). (410) is a blower which pressurizes and supplies gas to supply inlet (106). This gas is an inert gas such as helium, reduces the pressure in chamber (104), and carries active particles from the chamber into the source water (200).

In the water treatment apparatus of the above construction, oxygen gas (300) is supplied from starting material fluid inlet (105) under atmospheric pressure at a rate of approx. 0.5 l/min. At the same time, inert gas pressurized by blower (410) to a pressure of, for example, several atmospheres, is supplied to supply inlet (106), and jetted at high speed from jetting throat (108) of nozzle (107) towards diffuser throat (110). Gas in chamber (104) is then aspirated through gap (111) between nozzle (107) and diffuser throat (110), chamber (104) falls to low pressure, and oxygen atoms are generated in high concentration as in Embodiments 1 and 2. Subsequently, the oxygen atoms generated in chamber (104) pass at high speed through diffuser throat (110) together with the gas jetted at high speed from nozzle (107), and are blown out by diffusion tube (113) into the source water (200) in reservoir (400). The oxygen atoms oxidize and decompose the minute quantities of organix contaminants in the source wter, and a high degree of water purification is achieved.

The oxygen atoms thereby generated have a liftetime of approx. 10 msec, but as the speed of the gas moving through the diffuser throat (110) is very high the time taken by them to traverse diffuser throat (110) can effectively be ignored. They can therefore dissolved in source water (200) before they are destroyed.

By using this type of gas ejector, the pressure in chamber (104) can be reduced further compared to the case of a water ejector. With a water ejector, the pressure in chamber (104) cannot theoritically be reduced to less than that saturation vapor pressure of water at the temperature of the water jetted by nozzle (107) (for example, approx. 20 Torr at 20° C.). With a gas ejector, on the other hand, such a problem does not arise, and as the pressure can be reduce further, a high concentration of oxygen atoms is generated as shown in FIG. 4.

Further, since in the ejector (100), the fluid jetted from nozzle (107) is a gas, there is no problem of soiling of dielectric tube (101) and nozzle (107), and a high oxygen atom concentration can be generated efficiently over a long period of use.

In this embodiment, the gas which is pressure-jetted from nozzle (107) is an inert gas such as helium, but nitrogen gas ($N_2$) or carbon dioxide ($CO_2$) may also be used. It is however perferable to use an inert gas as there is then no reaction between the oxygen atoms generated and the gas which is jetted, and the oxygen atoms react well with the source water (200).

EMBODIMENT 4

Figure 13:
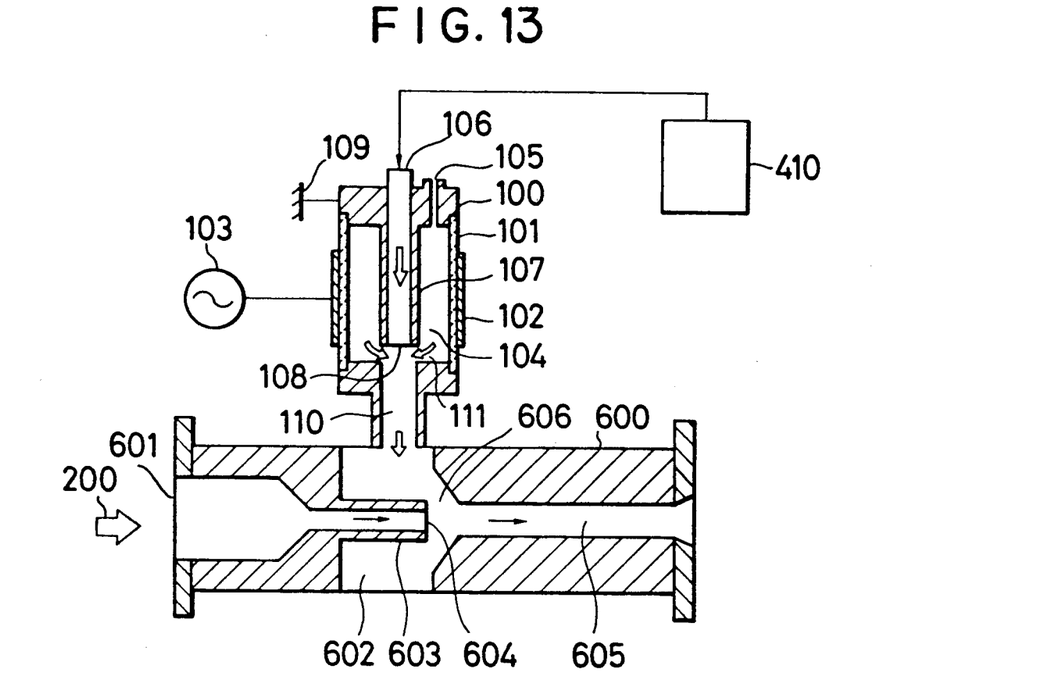
FIG. 13 is a longitudinal section of the water treatment apparatus in Embodiment 4 of this invention.

The water treatment apparatus of Embodiment 4 is a combination of a discharge tube-integrated gas ejector generating oxygen atoms as in Embodiment 3 above, and a water ejector for efficient mixing of source water and oxygen atoms. FIG. 13 is a sectional view of the water treatment apparatus of this embodimet. In the figure, (100) is an ejector which in this embodiment is a gas ejector. (600) is a water ejector with the function of mixing oxygen atoms and source water (200), (601) is a second supply inlet from which source water (200) is supplied to this water ejector (600), (602) is an aspiration chamber inside the water ejector (600) which communicates with diffuser throat (110) of ejector (100) and which aspirates gas from chamber (104), (603) is a second nozzle inserted in aspiration chamber (602) for high speed jetting, from second jetting throat (604), of source water (200) supplied from second supply inlet (601), and (605) is a diffuser throat arranged in the jetting direction of this second nozzle (603) via a gap (606) which communicates with aspiration chamber (602).

In the water treatment apparatus of the above construction, oxygen atoms are generated in ejector (100) as in the case of Embodiment 3, and introduced at high speed into aspiration chamber (602) of water ejector (600) together with gas jetted from nozzle (107). At the same time, source water (200) is supplied to the second supply inlet (601) of water ejector (600), and is jetted at high speed from second nozzle (603) towards second diffuser throat (605). Gas is then aspirated from aspiration chamber (602) through gap (606) between second nozzle (603) and second diffuser throat (605). As the gas in chamber (602) contains oxygen atoms introduced from gas ejector (100), these oxygen atoms dissolve in the source water (200) in second diffuser throat (605) where they oxidize and decompose, for example, minute quantities of organic contaminants in the water, and a high degree of water purification is thereby achieved.

In this water treatment apparatus, source water (200) is jetted from second nozzle (603), and aspirates gas from chamber (602). This creates a low pressure in aspiration chamber (602) of water ejector (600). Oxygen atoms generated in electrolytic dissociation chamber (104) of gas ejector (100) are therefore aspirated into chamber (602) together with gas jetted by nozzle (107), and are moreover transferred rapidly from chamber (104) to chamber (602). Further, as water ejector (600) has a powerful gas-liquid mixing action, the oxygen atoms are dissolved more efficiently than in the water treatment apparatus of Embodiment 3. They can therefore be used more efficiently, and a high degree of water purification is achieved.

Figure 14:
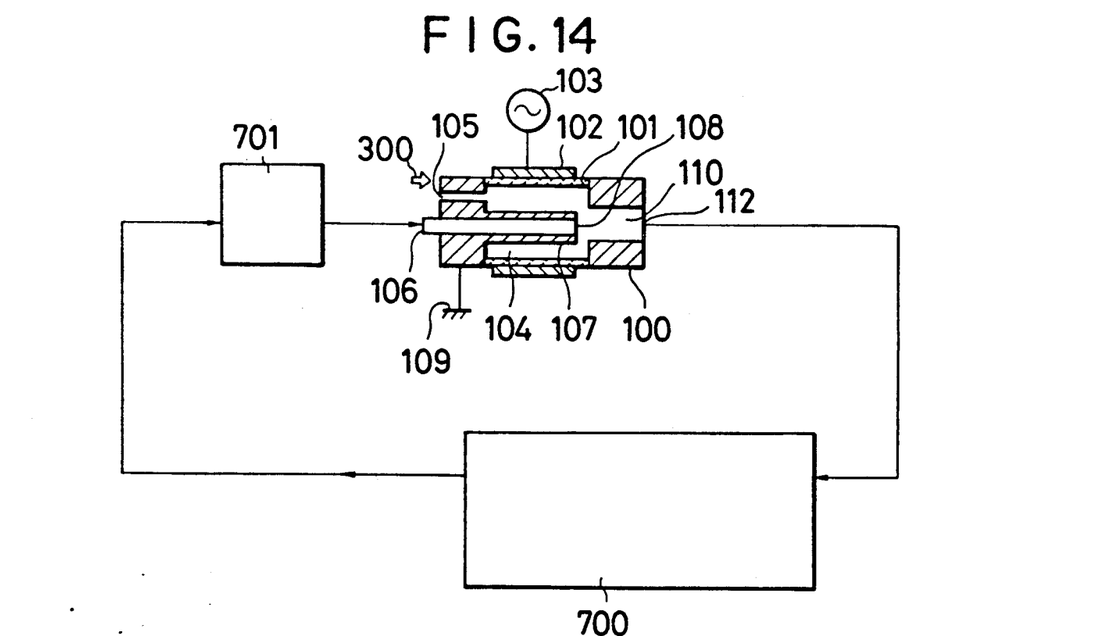
FIG. 14 is a drawing showing a gas treatment system using the gas treatment apparatus in another embodiment of this invention.

In the above embodiments, the source fluid is water. It may however be another liquid, or even a gas. FIG. 14, for example, shows a gas treatment system where the fluid treatment apparatus of Embodiment 1 is used for treating a gas. In this gas treatment system, a discharge tube-integrated gas ejector (100) is used, and the source fluid may for example be air containing minute quantities of organic contaminants. In FIG. 14, (700) is a container for storing air containing minute quantities of organic contaminants which is the source gas. (701) is a blower for compressing and supplying air from this container to supply inlet (106) of gas ejector (100).

In the gas treatment system of the above construction, oxygen atoms generated in chamber (104) at low pressure and high temperature as in the case of the above embodiments, react with the source air and purify it by means of their powerful oxidizing action.

Further, in the fluid treatment apparatus of the above embodiments, oxygen atoms which are the active particles are used as oxidizing agent. The invention is however not limited to this case, and molecular active oxygen in an excited state may be used instead of or in admixture with oxygen atoms. OH radicals may also be used.

Figure 15:
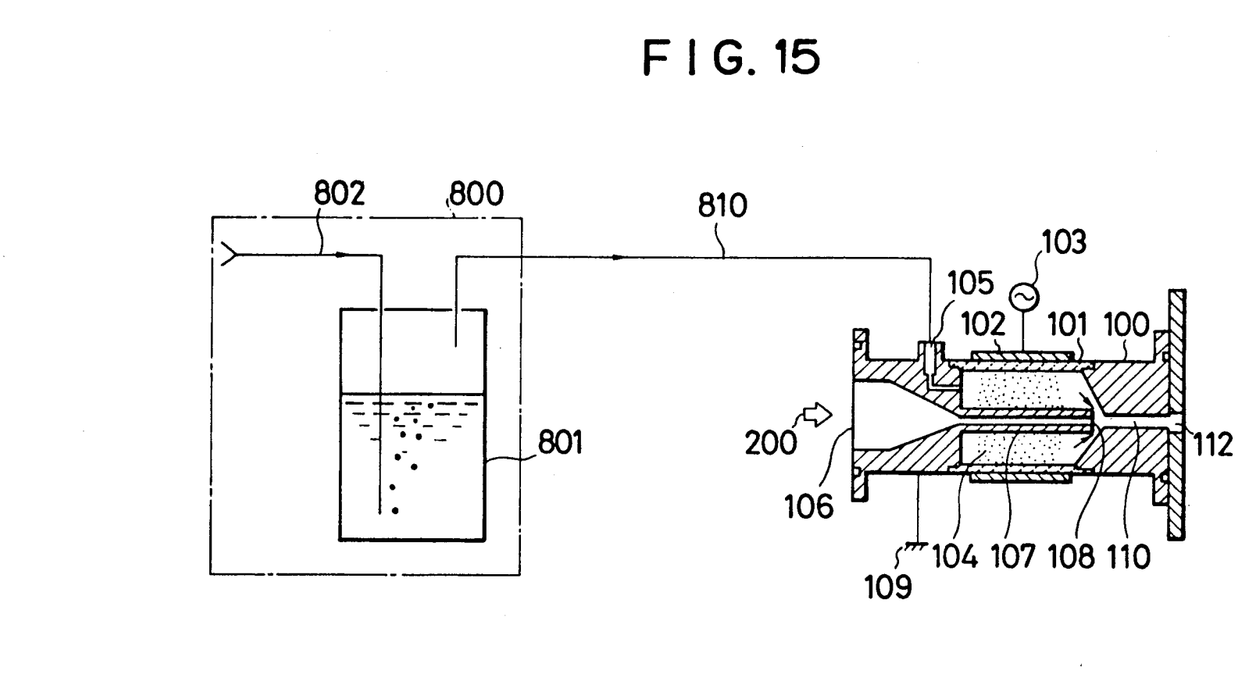
FIG. 15 and FIG. 16 are drawings showing the construction of a water treatment apparatus using OH radicals in further embodiments of this invention.

FIG. 15 shows a water treatment system where OH radicals are used in a discharge tube-integrated water treatment apparatus. In this figure, (800) is a water vapor generating means for generating gas containing water vapor. It comprises a container (801) of water, and a tube (802) which supplies, for example, a gas such as air or oxygen to aerate the water in the container (801). (810) is a supply channel for supplying gas containing water vapor from water vapor production means (800) to starting material fluid inlet (105) of water ejector (100).

The operation of the water treatment apparatus of the above construction wil now be described. Air is introduced by tube (802) inserted in container (801) so as to aerate the water in the container, and water vapor is produced. At the same time, source water (200) is supplied to supply inlet (106) of water ejector (100), and jetted by nozzle (107) towards diffuser throad (110). When the pressure in chamber (104) falls, water vapor generated in container (801) and air used for aeration form a gas containing water vapor which passes through supply channel (810), and is introduced into electrolytic dissociation chamber (104) from supply inlet (105). When a high voltage is subsequently applied to charging electrode (102), a silent discharge occurs in chamber (104), and OH radicals are generated according to equation (3) below:

$$H_2O + e \longrightarrow OH + H + e \tag{3}$$

Due to the electric discharge, the temperature in chamber (104) increases. OH radicals, as in the case of oxygen atoms described in the above embodiments, are also generated in high concentration under conditions of low pressure and high temperature, and are thus obtained with a high electrical efficiency. Further, at high temperature and low pressure, their lifetime is longer. In diffuser throat (110), which has a powerful gas-liquid mixing action, the OH radicals dissolve in the source water (200), and due to their powerful oxidizing action, organic contaminants in the water are oxidized and decomposed. The water is thereby purified.

The time for which OH radicals exist until they are destroyed is longer than oxgen atoms. In air, for example, their lifetime is as long as 10 msec or so, and they can therefore be used even more efficiently than oxygen atoms.

Figure 16:
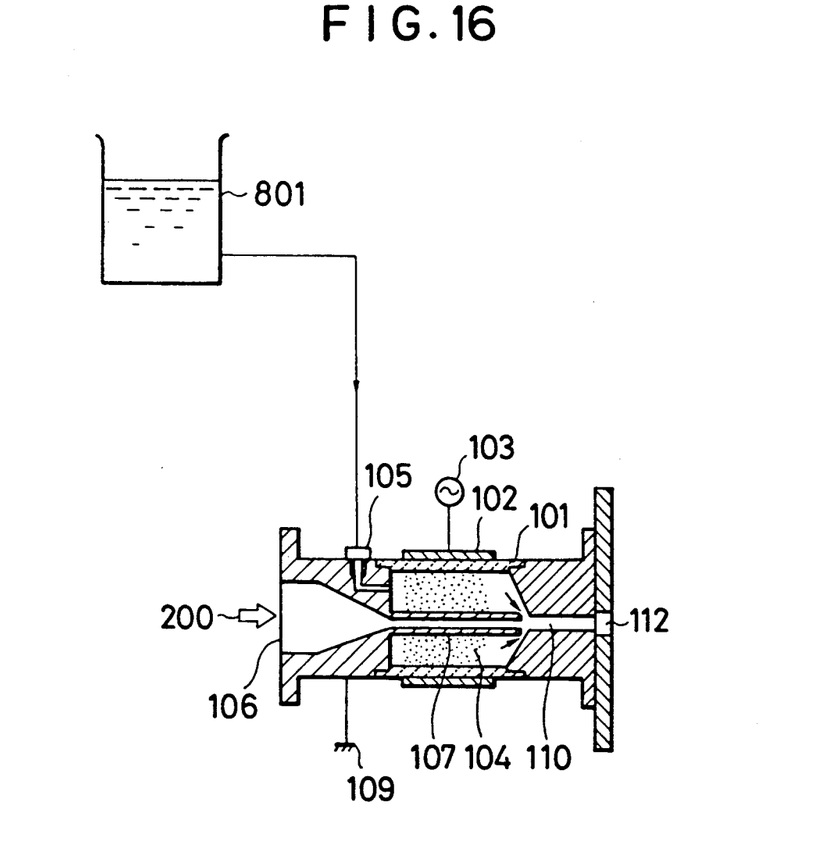

In the above embodiments, however, the fluid electrolytically dissociated in chamber (104) is a gas. As shown in FIG. 16, however, even if the water in container (801) is supplied directly to chamber (104), OH radicals, whch are the active particles, can still be generated. Since chamber (104) is at a very high temperature of approx. 600K, water introduced into the chamber is immediately vaporized, and as in the case where a gas containing water vapor is supplied to chamber (104), OH radicals are generated by the discharge.

Further, in the above embodiments, the electrolytic dissociation method is not limited to electric discharge. Dissociation may also be produced by ultraviolet irradiation or X-ray irradiation, or by a combination of these methods.

INDUSTRIAL APPLICABILITY

As described above, in the fluid treatment apparatus of this invention, active particles can be used in a fluid treatment apparatus even if an electric discharge is not produced in air bubbles in water as in the conventional method, and the construction of the apparatus can therefore be simplified. Further, the active particles are generated in a chamber at low pressure, so a high concentration of such particles is obtained for efficient fluid treatment.

The method of shutting down the fluid treatment apparatus of this invention, moreover, prevents source fluid flowing back from the diffuser throat of the electrolytic dissociation chamber. Active particles can therefore be produced constantly over long periods of use, and a high degree of water purification can be achieved over long periods.

We claim:

1. A fluid treatment apparatus comprising an electrolytic dissociation chamber into which a fluid to be electrolytically dissociated is introduced to generate active particles by electrolytic dissociation, a supply inlet for supplying a carrier gas to carry said active particles to a source fluid, a jetting throat which jets said carrier gas, and a diffuser throat in which the carrier gas jetted aspirates the active particles generated in said electrolytic dissociation chamber, and which ejects the carrier gas, the carrier gas ejected by this diffuser throat being conveyed to the source fluid together with said active particles.

2. A method of treating a source fluid comprising the steps of:
generating active particles by electrolytic dissociation of a fluid introduced to an electrolytic dissociation chamber;
supplying said source fluid to be treated by said active particles to a supply inlet to a jet throat thereby jetting said source fluid from the jet throat;
aspirating said active particles from said electrolytic dissociation chamber by said source fluid jetted from said jetting throat; and
dissolving said aspirated active particles in said source fluid jetted from said jetting throat in a diffuser throat.

3. A method of treating a source fluid according to claim 2, when said active particles are aspirated, a pressure of said electrolytic dissocation chamber is below atmospheric pressure.

4. A method of treating a source fluid according to claim 3, further comprising the steps of:
raising a pressure at an opening on a side of said diffuser throat where said active particles are aspirated above a pressure at the other end of said diffuser throat; and
stopping thereafter the supply of said source fluid to said supply inlet.

5. A fluid treatment apparatus for treating a source fluid, comprising:
means for generating active particles by electrolytic dissociation of a fluid introduced to an electrolytic dissociation chamber;
means for supplying said source fluid to be treated by said active particles through a supply inlet to a jet throat thereby jetting said source fluid from said jet throat;
means for aspirating said active particles from said electrolytic dissociation chamber by said source fluid jetted from said jet throat; and
means for dissolving said aspirated active particles in said ssource fluid jetted from said jet throat.

6. A fluid treatment apparatus according to claim 5, wherein said means for aspirating said active particles includes means for lowering a pressure of said electrolytic dissociation chamber below an atmospheric pressure.

7. A fluid treatment apparatus according to claim 5, wherein said means for aspirating said active particles includes means for lowering a pressure of said electrolytic dissociation chamber below 50 Torr.

8. A fluid treatment apparatus according to claim 5, wherein said means for generating active particles includes means for charging electrodes for producing a silent discharge in said electrolytic dissociation chamber.

9. A fluid treatment apparatus according to claim 8, wherein said means for charging electrodes for producing the silent discharge includes means for raising a temperature of said electrolytic dissociation chamber above an atmospheric temperature.

10. A fluid treatment apparatus according to claim 8, wherein said means for charging electrodes for producing the silent discharge includes means for raising a temperature of said electrolytic dissociation chamber above 600K.

11. A fluid treatment apparatus according to claim 8, wherein said means for generating said active particles includes means for generating oxygen atoms from oxygen molecules introduced to said electrolytic dissociation chamber.

12. A fluid treatment apparatus according to claim 8, wherein said means for generating said active particles includes means for generating OH radicals from $H_2O$ molecules introduced to said electrolytic dissociation chamber.

13. A fluid treatment apparatus according to claim 5, wherein said means for supplying said source fluid includes means for supplying water pressurized to approximately 2 $Kg/cm^2$ to 3 $Kg/cm^2$ through said supply inlet to said jet throat.

14. A fluid treatment apparatus according to claim 5, wherein said means for jetting said source fluid includes means for jetting said source fluid from said jet throat in a direction of gravitational force.

15. A fluid treatment apparatus for treating a source fluid, comprising:
means for generating active particles by electrolytic dissociation of a fluid introduced to an electrolytic dissociation chamber;
means for supplying a carrier gas to carry said active particles through a supply inlet to a jet throat thereby jetting said carrier gas from aid jet throat;
means for aspirating said active particles from said electrolytic dissociation chamber by said carrier gas jetted from said jet throat;
means for conveying said carrier gas together with said active particles toward a diffuser throat; and
means for ejecting said carrier gas together with said active particles from said diffuser throat into said source.

16. A fluid treatment apparatus according to claim 5, wherein said means for aspirating said active particles includes means for lowering a pressure of said electrolytic dissociation chamber below an atmospheric pressure.

17. A fluid treatment apparatus according to claim 15, wherein said means for aspirating said active particles includes means for lowering a pressure of said electrolytic dissociation chamber below 50 Torr.

18. A fluid treatment apparatus according to claims 15, wherein said means for generating active particles includes means for charging electrodes for producing a silent discharge in said electrolytic dissociation chamber.

19. A fluid treatment apparatus according to claim 18, wherein said means for charging electrodes for producing the silent discharge includes means for raising a temperature of said electrolytic dissociation chamber above an atmospheric temperature.

20. A fluid treatment apparatus according to claim 18, wherein said means for charging electrodes for producing the silent discharge includes means for raising a temperature of said electrolytic dissociation chamber above 600K.

21. A fluid treatment apparatus according to claim 18, wherein said means for generating said active particles includes means for generating oxygen atoms from oxygen molecules introduced to said electrolytic dissociation chamber.

22. A fluid treatment apparatus according to claim 18, wherein said means for generating said active particles includes means for generating OH radicals from $H_2O$ molecules introduced to said electrolytic dissociation chamber.

23. A fluid treatment apparatus according to claim 15, wherein said means for supplying said carrier gas includes means for supplying a pressurized inert gas.

24. A fluid treatment apparatus according to claim 15, wherein said means for jetting said source fluid includes means for jetting said source fluid from said jet throat in a direction of gravitational force.

* * * * *